US009019358B2

(12) United States Patent
Mestha et al.

(10) Patent No.: US 9,019,358 B2
(45) Date of Patent: Apr. 28, 2015

(54) METHOD FOR CLASSIFYING A PIXEL OF A HYPERSPECTRAL IMAGE IN A REMOTE SENSING APPLICATION

(75) Inventors: Lalit Keshav Mestha, Fairport, NY (US); Beilei Xu, Penfield, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1091 days.

(21) Appl. No.: 13/023,310

(22) Filed: Feb. 8, 2011

(65) Prior Publication Data

US 2012/0200682 A1 Aug. 9, 2012

(51) Int. Cl.
*H04N 7/18* (2006.01)
*G06K 9/00* (2006.01)

(52) U.S. Cl.
CPC .................................. *G06K 9/0063* (2013.01)

(58) Field of Classification Search
None
See application file for complete search history.

(56) References Cited

U.S. PATENT DOCUMENTS

| | | | |
|---|---|---|---|
| 5,539,517 A | 7/1996 | Cabib et al. | |
| 6,295,130 B1 | 9/2001 | Sun et al. | |
| 6,373,568 B1 | 4/2002 | Miller et al. | |
| 6,721,692 B2 | 4/2004 | Mestha et al. | |
| 6,825,930 B2 | 11/2004 | Cronin et al. | |
| 6,829,370 B1 | 12/2004 | Pavlidis et al. | |
| 7,304,801 B2 | 12/2007 | Wang et al. | |
| 7,355,714 B2 | 4/2008 | Wang et al. | |
| 7,385,704 B2 | 6/2008 | Mestha et al. | |
| 7,417,746 B2 | 8/2008 | Lin et al. | |
| 7,469,060 B2 | 12/2008 | Bazakos et al. | |
| 7,551,785 B2 * | 6/2009 | Qian et al. | 382/232 |
| 7,734,061 B2 | 6/2010 | Breed et al. | |
| 7,738,678 B2 | 6/2010 | Breed et al. | |
| 7,831,358 B2 | 11/2010 | Breed et al. | |
| 8,295,578 B2 * | 10/2012 | Lundgren et al. | 382/141 |
| 2003/0053659 A1 | 3/2003 | Pavlidis et al. | |
| 2003/0053664 A1 | 3/2003 | Pavlidis et al. | |

(Continued)

FOREIGN PATENT DOCUMENTS

WO WO 2005/119571 6/2005

OTHER PUBLICATIONS

Varchei, et al., "People tracking using a network-based PTZ camera", Machine Vision and Applications DOI 10.1007/s00138-010-0300-1, Springer-Verlag, Published online: Oct. 1, 2010.

(Continued)

*Primary Examiner* — Mehrdad Dastouri
*Assistant Examiner* — James Anderson, II
(74) *Attorney, Agent, or Firm* — Philip E. Blair; Fleit Gibbons Gutman Bongini & Bianco P.L.

(57) ABSTRACT

What is disclosed is a novel system and method for simultaneous spectral decomposition suitable for image object identification and categorization for scenes and objects under analysis. The present system captures different spectral planes simultaneously using a Fabry-Perot multi-filter grid each tuned to a specific wavelength. A method for classifying pixels in the captured image is provided. The present system and method finds its uses in a wide array of applications such as, for example, occupancy detection in a transportation management system and in medical imaging and diagnosis for healthcare management. The teachings hereof further find their uses in other applications where there is a need to capture a two dimensional view of a scene and decompose the scene into its spectral bands such that objects in the image can be appropriately identified.

23 Claims, 16 Drawing Sheets

(56) References Cited

U.S. PATENT DOCUMENTS

| | | | | |
|---|---|---|---|---|
| 2003/0187616 | A1* | 10/2003 | Palmadesso et al. | 702/181 |
| 2007/0268485 | A1* | 11/2007 | Polonskiy et al. | 356/300 |
| 2008/0123097 | A1* | 5/2008 | Muhammed et al. | 356/419 |
| 2009/0033918 | A1 | 2/2009 | Lin et al. | |
| 2010/0003044 | A1 | 1/2010 | Burry et al. | |
| 2010/0140461 | A1* | 6/2010 | Sprigle et al. | 250/226 |

OTHER PUBLICATIONS

Li, et al., "Probabilistically Semantic Labeling of IR Image for UAV", MVA2007 IAPR Conference on Machine Vision Applications, May 16-18, 2007, Tokyo, Japan, pp. 441-444.

Vehicle Occupancy Ltd.—News, Press Release, Jun. 11, 2007, http://www.vehicleoccupancy.com/pages/pr-140607.html.

Pavlidis, I., et al., "A Vehicle Occupant Counting System Based on Near-Infrared Phenomenology and Fuzzy Neural Classification", IEEE Transactions on intelligent transportation systems, vol. 1, No. 2, Jun. 2000.

Beletic, J.W., et al., "Teledyne Imaging Sensors: Infrared imaging technologies for Astronomy & Civil Space", Proceedings of the SPIE Conference on Astronomical Instrumentation, 2008, pp. 1-14, Marseille, France.

Pavlidis et al., "Automatic Passenger Counting in the High Occupancy Vehicle (HOV) Lanes", Proceedings 1999 Annual Meeting of the Intelligent Transportation Society of America, Washington, D.C., Apr. 19-22, 1999.

Pavlidis, I. et al., "A Near-Infrared Fusion Scheme for Automatic Detection of Vehicle Passengers", Proceedings 1999 IEEE Workshop on Computer Vision Beyond the Visible Spectrum: Methods and Applications, pp. 41-48, Fort Collins, CO, Jun. 22, 1999.

Penev et al., "Local feature analysis: a general statistical theory for object representation", network: Computation in Neural Systems, 7(3): 477-500, Aug. 1996, IOP Publishing Ltd.

Pavlidis, I., et al., "Automatic detection of vehicle occupants: the imaging problem and its solution", N.P., Machine Vision and Applications (11), No. 6, 2000, pp. 313-320.

Pérez,-Jiménez, A.J., et al., "High Occupancy Vehicle Detection", SSPR&SPR 2008, LNCS 5342, pp. 782-789.

Goktuk, S.B., et al., "An Occupant Classification System—Eigen Shapes or Knowledge-Based Features", MVIV05 (III: 57-57).

Nunez, A.S., et al., "Melanosome Level Estimation in Human Skin From Hyperspectral Imagery", Air Force Institute of Technology, OH 45433-7765, downloaded from IEEE Xplore on Aug. 2, 2010.

"Liquid Crystal Filled Fabri-Perot Filter", 2005 Meadowlark Optics, Inc., pp. 1-4.

Product Brochure—AISA Family of Hyperspectral Systems.

\* cited by examiner

| | NORM OF REF SKIN VECTOR (A) | NORM OF SAMPLE REFLECTANCE VECTOR (B) | RATIO = (A)/(B) |
|---|---|---|---|
| peter04_teashirt | 491.0045 | 676.8042 | 1.3784 |
| graham04_teashirt | 491.0045 | 809.3652 | 1.6484 |
| graham04_jacketinside | 491.0045 | 848.2195 | 1.7275 |
| lk04_shirt | 491.0045 | 694.516 | 1.4145 |
| lk04_skin | 491.0045 | 491.5662 | 1.0011 |
| graham04_skin | 491.0045 | 507.3561 | 1.0333 |

FIG. 15

METHOD FOR CLASSIFYING A PIXEL OF A HYPERSPECTRAL IMAGE IN A REMOTE SENSING APPLICATION

TECHNICAL FIELD

The present invention is directed to systems and methods for analyzing a hyperspectral image taken by a hyperspectral camera and classifying pixels in that image such that an object captured by the camera system can be identified.

BACKGROUND

Hyperspectral imaging is the process of using specialized sensors to collect image information across the electromagnetic spectrum (unlike the human eye, which just sees visible light). Objects have their own respective fingerprints known as "spectral signatures" which effectuate the identification of the materials that make up the object. For example, the spectral signature for oil helps mineralogists locate oil fields. Hyperspectral imaging (as opposed to multi-spectral imaging) deals with imaging narrow contiguous spectral bands over a large spectral range, and produces the spectra of all pixels in the captured scene. A sensor with only 20 bands can also be hyperspectral when it covers a substantial spectral range (for example, from 500 nm to 700 nm with 20 10 nm wide bands). Whereas, a sensor with 20 discrete bands covering the same range whose wavelengths are not continuous and cannot be assigned specifically (for example, a 7 channel Flux Data camera, FD-1665) due to the use of multiple broad band filters would be considered multispectral. The primary advantages to hyperspectral imaging is that, because an entire spectrum is acquired at each point, and the wavelengths are known, the operator needs no prior knowledge of the sample, and post-processing allows all available information from the dataset to be mined. Disadvantages are cost and complexity as high-speed computers, very sensitive detection equipment, and large storage capacities, are often required for analyzing hyperspectral data. Data storage capacity is significant since hyperspectral image/data cubes are large multi-dimensional datasets. All of these factors greatly increase the cost of acquiring and processing hyperspectral data. The acquisition and processing of hyperspectral images is also referred to as 'imaging spectroscopy'. In an increasing variety of diverse applications, there is a need to capture two dimensional images of a scene or object of interest and decompose the captured image into its spectral bands such that objects in the image can be identified.

Accordingly, what is needed are increasingly sophisticated systems and methods for analyzing a hyperspectral image taken by a hyperspectral camera and classifying the pixels in that image such that an object captured by the camera system can be identified in remote non-invasive sensing applications.

INCORPORATED REFERENCES

The following Patents, Publications, and Applications, are incorporated herein in their entirety by reference.

"Reconfigurable MEMS Fabry-Perot Tunable Matrix Filter Systems And Methods", U.S. Pat. No. 7,355,714, to Wang et al.

"Structure And Method For A Microelectromechanically Tunable Fabry-Perot Cavity Spectrophotometer", U.S. Pat. No. 6,295,130, to Sun et al.

"Two-Dimensional Spectral Cameras And Methods For Capturing Spectral Information Using Two-Dimensional Spectral Cameras", U.S. Pat. No. 7,385,704, to Mestha et al.

"Fabry-Perot Tunable Filter Systems And Methods", U.S. Pat. No. 7,417,746, to Lin et al.

"Fabry-Perot Tunable Filter Using A Bonded Pair Of Transparent Substrates", U.S. Pat. No. 7,734,131, to Lin et al.

"Fabry-Perot Tunable Filter", US Publication No. 20070242358, by Lin et al.

"Distributed Bragg Reflector Systems And Methods", U.S. Pat. No. 7,304,801, to Wang et al.

"Fabry-Perot Piezoelectric Tunable Filter", US Patent Publication No. 20090040616.

"*Liquid Crystal Filled Fabry-Perot Filter*", Meadowlark Optics, Inc. (2005).

BRIEF SUMMARY

What is disclosed is a novel system and method for simultaneous spectral decomposition suitable for image object identification and categorization for scenes and objects under analysis. The present system employs a hyperspectral camera using a Fabry-Perot multi-filter grid each tuned to a specific wavelength in order to capture different spectral planes (or also called bands comprised of narrow wavelength region centered around the wavelength of interest) of an image simultaneously. Method for classifying pixels in the captured image are provided herein. The present system and method advantageously finds its intended uses in transportation management systems for occupancy detection in moving vehicles, in healthcare management for medical imaging and diagnosis, security systems, and in an array of other applications where a need exists to capture an image of a scene and decompose that image into its spectral bands such that objects in the image can be identified.

In one embodiment, the present method for identifying a target object in a captured hyperspectral image involves the following. Different spectral planes of a scene containing objects of interest are captured using a hyperspectral camera capable of capturing hyperspectral images simultaneously. Each image represents one spectral plane captured at a specified wavelength. The camera has an array of sensors and a multi-filter grid for multi-band image capture. Each of the filters is tuned to a specific wavelength of the electromagnetic (EM) spectrum. The captured image is pre-processed in a manner described herein and a hyperspectral image data cube generated comprising an array of spectral planes. Each of the planes comprises a 2-dimensional array of pixels each having a respective intensity value at one of the wavelengths specified by the filters. Then, for each pixel location in the hyperspectral image data cube a multi-dimensional vector is constructed from intensity values of pixels at this location from across the array of spectral planes. The vector is constructed along the wavelength direction. A norm of this vector is calculated. Thereafter, pre-determined reference vectors of known sample materials are iteratively retrieved from a storage device and a vector norm is calculated for the retrieved reference vector. A ratio is formed of the vector norm and the norm of the reference vector and a value of that ratio is generated. In a manner more fully described herein, a determination is then made as to whether the pixel at this location in the captured image belongs to this known sample based upon a value of the ratio. If so then this pixel can be classified accordingly. Otherwise, a next reference vector is retrieved and the process is iterated until the pixel is classified or no more reference vectors exist in the database to be retrieved, in which case the pixel at this location in the image is undetermined. Various embodiments of a hyperspectral camera and the pixel classification method are disclosed.

Features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 15 is a table showing results of ratios of norms of vectors of various materials and norms of reference vectors and a value of these ratios;

DETAILED DESCRIPTION

What is disclosed is a novel system and method for simultaneous spectral decomposition suitable for image object identification and categorization for scenes and objects under analysis.

Non-Limiting Definitions

A "pixel" is the smallest addressable element in an image. Pixels are normally arranged in a 2D grid. The intensity of each pixel depends on the sensitivity of the sensors to the wavelength being used to measure that pixel, the illumination, and the reflectance of the object.

A "hyperspectral camera" is a device for capturing a hyperspectral image. Hyperspectral cameras are readily available from a wide array of vendors in various streams of commerce.

A "hyperspectral image" is an image captured by a hyperspectral camera. Every pixel in such an image contains an associated intensity value measured in reflectance. Hyperspectral images provide spectral information about a scene than normal color images which only capture channels corresponding to the visual primary colors, typically RGB.

Figure 5:
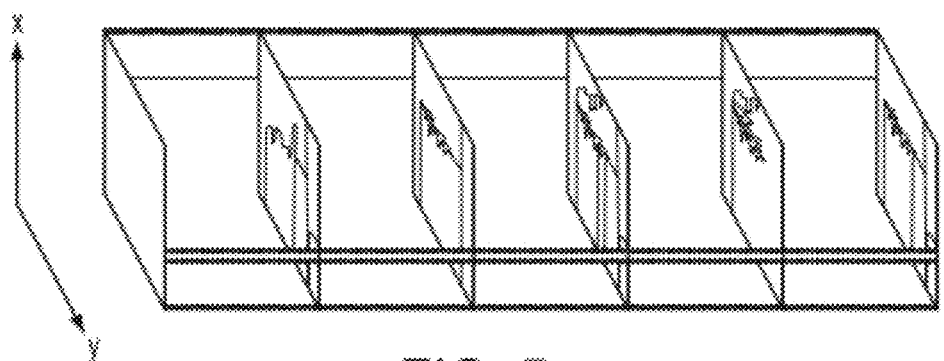
FIG. 5 illustrates an example image decomposed into a spectral plane at each of six wavelength bands. (This figure is reproduced from "*Spectral Imaging for Remote Sensing*" by Gary A. Shaw and Hsiao-Hua K. Burke, Lincoln Laboratory Journal, Vol. 14, No. 1, (2003))
Figure 6:
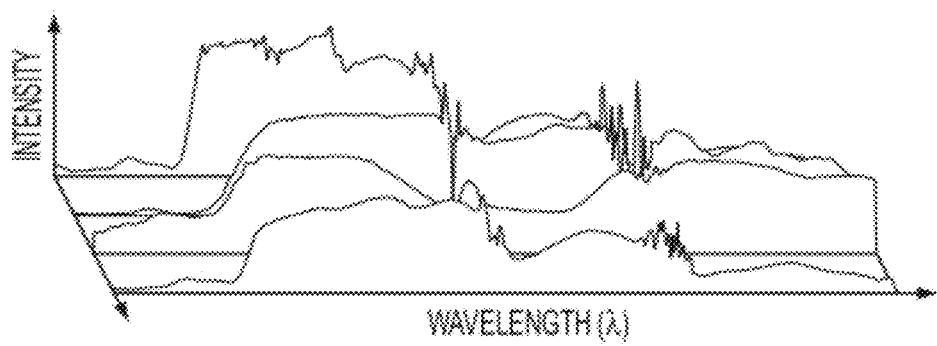
FIG. 6 illustrates example spectral components of the image of FIG. 5.
Figure 9:
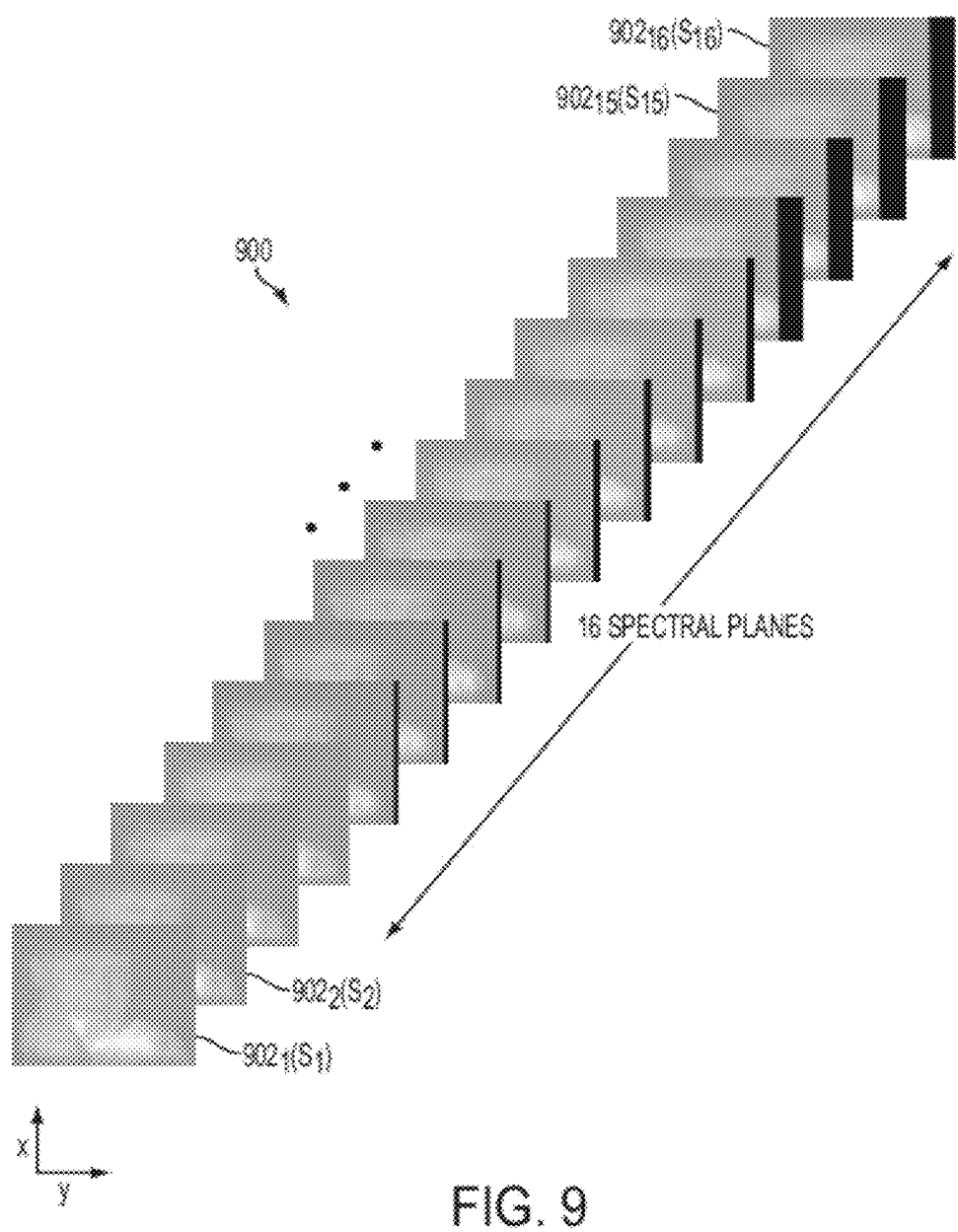
FIG. 9 illustrates a hyperspectral image data cube constructed from the array of FIG. 8.

A "hyperspectral image data cube" is a 3D matrix constructed using an array of 2D images combined with a third dimension giving the spectral composition of each pixel of the image. The combination of the 2D image data and the 1D spectral components collectively comprise the 3D hyperspectral image/data cube. FIG. 5 illustrates an example image decomposed into a plurality of spectral planes at each of six wavelength bands. FIG. 6 shows example spectral components corresponding to the example of FIG. 5. An example hyperspectral image data cube is shown in FIG. 9.

A "multi-dimensional vector" is a vector constructed using intensity values along a wavelength direction of pixel locations from across an array of spectral planes. Each pixel location in the 2D array of spectral planes has a corresponding multi-dimensional vector.

A "Fabry-Perot Multi-Filter Grid" is a grid of Fabry-Perot filters with each filter transmitting a desired wavelength band and rejecting wavelengths outside that band. Fabry-Perot filters enable the selection of different peak wavelengths. Various embodiments of Fabry-Perot filters are shown in several of the above-incorporated references.

Example Fabry-Perot Cavity Structure

The basic structure of a Fabry-Perot cavity includes two micro-mirrors separated by a gap which may be an air gap or filled with liquid or other material. The micro-mirrors include multi-layer distributed Bragg reflector (DBR) stacks or highly reflective metallic layers, such as gold. A voltage applied between the two mirrors may be adjusted to change the distance between the two mirrors. The distance between the two mirrors is also referred to as the dimension or size of the gap. The size of the gap may also be called a height of the gap. Only light with certain wavelengths may be able to pass through the gap due to the interference effect of incident light and reflective light.

Figure 1:
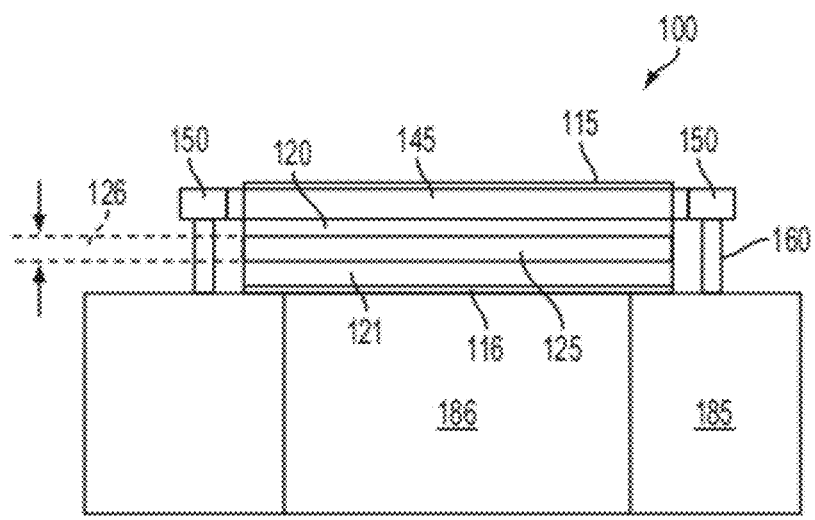
FIG. 1 illustrates a side view of a prior art Fabry-Perot cavity structure.

FIG. 1 shows a side view of one example prior art Fabry-Perot (F-P) micro-electro-mechanically tunable cavity structure 100. The cavity structure 100 may include a top mirror 120 and a bottom mirror 121. The bottom mirror may be a bottom distributed Bragg reflector (DBR) mirror that includes three pairs of quarter wavelength $Si/SiN_x$ stacks. The top mirror may be a top distributed Bragg reflector (DBR) mirror that includes two pairs of quarter wavelength $Si/SiN_x$ stacks. The cavity structure may also include a top electrode 115 formed on the top mirror via a support element 145, and a bottom electrode 116 formed between the bottom mirror 121 and substrate 185. Support element 145 may be a transparent substrate. The top and bottom electrodes may be transparent electrodes comprising, for example, indium tin oxide (ITO). Top and bottom mirrors 120 and 121 may be separated by a gap cavity 125 which is maintained using a plurality of springs 150 each corresponding to a respective one of a plurality of anchors 160. The plurality of springs are connected to support element 145 such that the top mirror is kept away from the bottom mirror by the gap cavity. The gap cavity 125 may be characterized by the distance 126 between the top and bottom mirrors which represents a dimension of the gap cavity, and may be referred to as a size or height of the gap cavity. Size 126 may be changed or otherwise adjusted. For example, top mirror 120 may be deformed to a dimensional change in the gap cavity by applying a voltage in the range of 5-100 volts across transparent bottom electrode 116 and transparent top electrode 115, or a charge in the range of $10^{-11}$ coulombs on the transparent bottom electrode and transparent top electrode to effect a change in the size of the gap cavity to a desired gap, e.g., for 1000 nm, we need about 500 nm gap. See "*Optical Microsystems in Silicon Based on a Fabry-Perot Resonance Cavity*", Delft University Press (1999), ISBN 9040718709, which is incorporated herein in it's entirety by reference. Hence, electrodes 115 and 116 may form a capacitor and, as such, Fabry-Perot cavity structure 100 may have a capacitance. As the size of gap cavity 125 decreases, the Fabry-Perot transmission peak shifts to shorter wavelengths. In the cavity structure 100, light may be received at the top of the cavity structure 100 through the top electrode 115. The received light may be transmitted through the gap cavity 125 and the portion 186 of the substrate 185 at a tuned wavelength. The gap may be fixed when the tunability is not required. Also, no actuation hardware mechanism will be required for fixed gap filter and filter grid in which the combinations of plurality of Fabry-Perot cells are arranged in a grid fashion.

Example First Fabry-Perot Optical System

Figure 2:
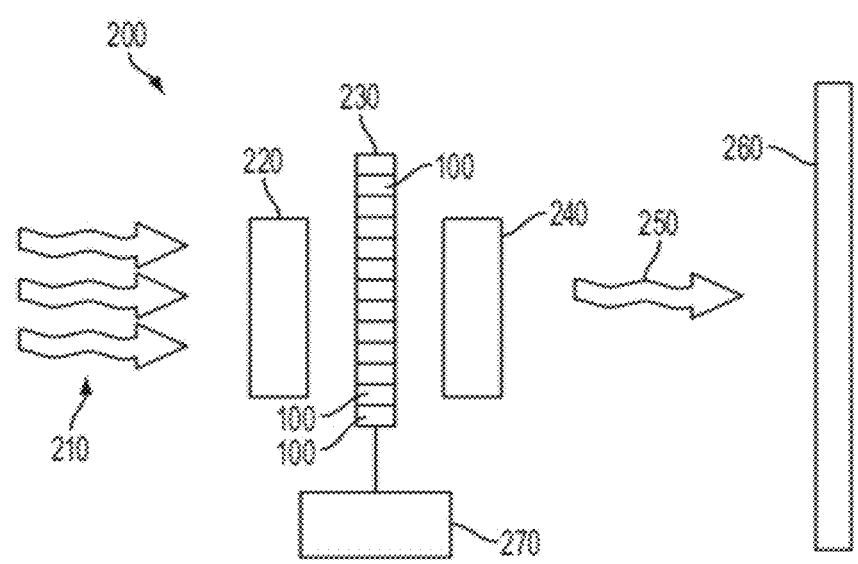
FIG. 2 illustrates a prior art Fabry-Perot optical system having a spectral filter array.

In FIG. 2, the Fabry-Perot optical system 200 provides a Fabry-Perot tunable filter array 230 with each element of the filter array comprising a cavity structure 100, as shown in FIG. 1. The filter array may be located between a first optical lens 220 and a second optical lens 240. Optical images passed through the first optical lens become collimated to increase the efficiency and resolution of the Fabry-Perot optical system. The first optical lens may be a convex lens and the second optical lens may be a concave lens. The first optical lens preferably is a honeycomb lens structure positioned along the optical axis to direct the dispersed light components through the Fabry-Perot multi-filter grid onto 2D sensor array 260. Optical lenses 220 and 240 provide collimation of light. For example, the first optical lens 220 collimates light of the incoming image 210 to the filter array 230. The tunable filter array may be connected to a switching circuit 270. The size of the cavity in each of the cavity structure may be adjusted by switching circuit 270 to give a desired transmissive frequency or frequencies. The switching circuit may also be a sampling circuit that provides modulation data that contains modulation signals to select the desired frequency or frequencies. One cavity structure may correspond to one pixel of an incoming image 210. As a result, the incoming image may be filtered to produce a filtered image 250, such as a spectral image produced by filtering the incoming image at a wavelength corresponding to the size of the cavity. Filtered image 250 may be output through an output device (not shown). Alternatively, the filtered image may be detected by a detector 260 which may comprise an array of CCD or CMOS sensors.

Detector 260 is separated from the filter array 230 by second lens 240. The filter array may be formed on a chip on which the detector is not formed. With such an arrangement, the detector may be made with high resolution. The size of a CCD, which acts as a detector array, may be much larger than the aperture because the CCD is placed at a distance from the filter array 230. Second optical lens 240 may be located between the filter array and detector 260 because the detector is separate and at a distance from the filter array. The second optical lens may collimate the filtered image 250 from the filter array to the detector such that the light beams reaching the detector 260 are parallel light beams. In the structure in which the filter array is formed on a chip without the detector 260, the Fabry-Perot optical system 200 may be used without the detector so that it may function as a filter. Alternatively, the Fabry-Perot optical system 200 is used in combination with the detector so that the filtered image may be detected by the detector. The detected image may be displayed on a display device, such as a LCD device (not shown).

As discussed above with respect to FIG. 1, the size of the cavity is adjustable. Thus, the filtered image may be generated at any wavelength covered by the spectral space within the adjustable range of the gap cavity. The filtered image can be generated in various wavelengths by adjusting the size of the gap cavity to transmit selectively very narrow wavelengths or collectively a group of wavelengths of the pixels of the incoming image. The filter array may be a two-dimensional array of thin membranes and may be matrix addressable as a group, or independently. The membranes may be addressed by actuating voltage signals according to modulation signals actuated to drive each cavity 100 to achieve a desired spectral resolution. Parallel actuation may be effectuated by actuating the two-dimensional array simultaneously. In parallel actuation, two parallel mirrors of Fabry-Perot device moves close to each other or away from each other and still maintain their parallelism. Higher spatial resolution of an image may be obtained by arranging combinations of a plurality of Fabry-Perot cells on the filtered chip and the plurality of sensors on the detector chip in a grid fashion. A Fabry-Perot cell may include the plurality of gap cavities, each having a cavity structure such as structure 100 of FIG. 1. When there is no actuation required, the membranes may be replaced by thin reflecting films and gaps are fixed based on wavelength needs.

Spectral resolution of filter array 230 depends on the mean reflectivity of the mirrors forming the gap cavity 125. The spectral range of a gap cavity depends on the initial size of the gap cavity and the quarter wavelength $Si/SiN_x$ stacks used. For light in the infrared region, the size of the gap cavity may be on the order of the infrared wavelength range. When the tuning range of the gap cavity is limited because of, for instance, structural limitations, a system consisting of more than one membrane with different initial gap cavity sizes and different quarter wavelength stacks may be used to cover a broader spectral range. Such a system may be designed to cover a spectral range from ultra-violet (UV) to infrared (IR). Various embodiments of such a system are disclosed in the above-incorporated reference to Wang et al.

In FIG. 2, the filter array 230 may be made of an array of small-sized micro Fabry-Perot interferometers. Such a structure may ensure the parallel actuation of the Fabry-Perot interferometers to improve the uniformity among the Fabry-Perot interferometers because each cavity can be individually adjusted based upon calibration data containing calibration signals. The calibration may be conducted by, for example, the switching circuit 270.

Example Second Fabry-Perot Optical System

Figure 3:
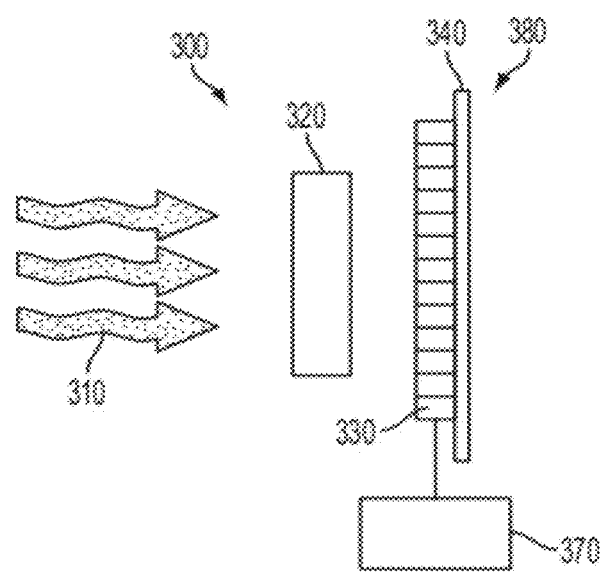
FIG. 3 illustrates a second prior art Fabry-Perot optical system.

FIG. 3 illustrates a second example prior art Fabry-Perot optical system 300 with each of the gap cavities having an associated photodetector. In this embodiment, detector 340 is formed on the same chip 380 where the Fabry-Perot array 330 is formed. Each element of the Fabry-Perot array may be a cavity structure shown in FIG. 1. In such a configuration, an incoming image 310 arrives at the Fabry-Perot array where spectral information is obtained and imaged by the Fabry- Perot array and detector 340, respectively, based on signals from a sampling circuit 370, such as circuit 270 shown in FIG. 2. Optical lens 320 may be placed in front of the Fabry-Perot array for collimation. A second optical lens, such as the second optical lens 240 of FIG. 2, will not be necessary. When there are no movable parts, i.e., when the Fabry-Perot gaps are fixed in the factory, no actuation circuit will be required. As a result, the size of the fixed gap is not changed during operation.

In the Fabry-Perot array 230 of FIG. 2 and the Fabry-Perot array 330 in FIG. 3, a plurality of cavity groups is provided with each cavity group having a set of fixed gaps to obtain spectral information of a single pixel in an image, such that the plurality of groups corresponds to a plurality of respective pixels of the image. Each cavity having a fixed gap is a gap cavity with a fixed size. The size of the fixed gap is not changed during operation. However, the fixed size of the gap cavity is reconfigurable. Each fixed gap only allows a narrow band of wavelength to transmit (or reflect) light. Within a cavity group, the sizes of fixed gaps differ from one another so that the spectra of the pixel may be assembled from each wavelength band of each of the fixed gaps within the cavity group. In particular, each pixel may contain a group of spectral characteristics with each spectral characteristic being associated with one or more wavelengths. Because one pixel corresponds to a group of cavities, each specific cavity in a cavity group may be designated to obtain a spectral characteristic associated with a specific wavelength that corresponds to the cavity size of the specific cavity. Also, because the cavity array contains a plurality of cavity groups and each cavity group may have one cavity having the specific cavity size, all the cavities having the specific cavity size forms a sub-array of cavities. This sub-array may obtain a spectral image at the specific wavelength corresponding to the specific cavity size. A cavity group may be arranged in a N×M array, where N and M are integers, so that the group occupies a square or rectangle. When the cavity group is arranged in a N×M array, N×M is the number of wavelength bands available for one pixel. For example, to obtain 12 points in the spectral wavelength between 400 nm and 700 nm, the cavity group may have a 4×3, 6×2, or 12×1 single Fabry-Perot design. The gaps may be configured and reconfigured to obtain spectral information of the pixel at a different range and/or resolution of optical spectrum. For example, one range of optical spectrum in the visible may be from 400 nm to 700 nm. Another range may be from 380 nm to 730 nm. Similarly, in the infrared wavelength band, one range may be from 1200 nm to 1600 nm and another range from 1400 nm to 1800 nm and so on.

Example Array of Captured Images

Figure 4A:
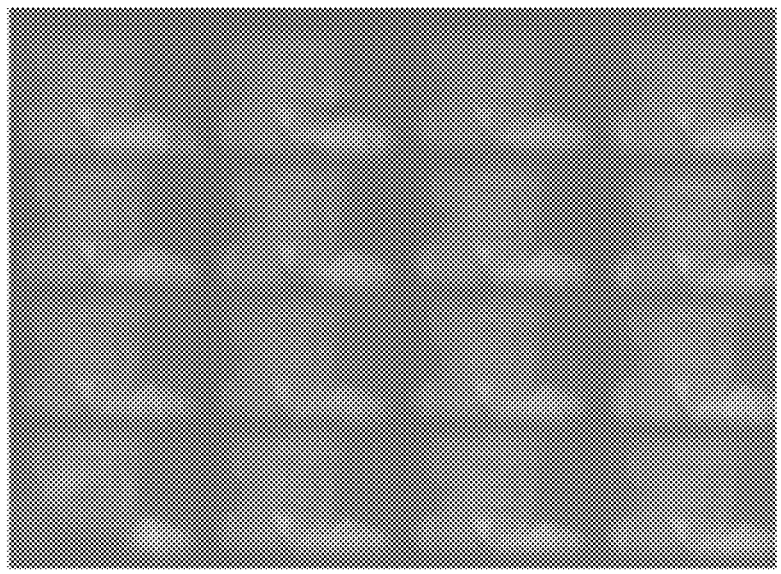
FIG. 4A shows an example image captured on a 640×512 Xenics InGaAs IR Camera using a 4×4 grid of Fabry-Perot filters.
Figure 4B:
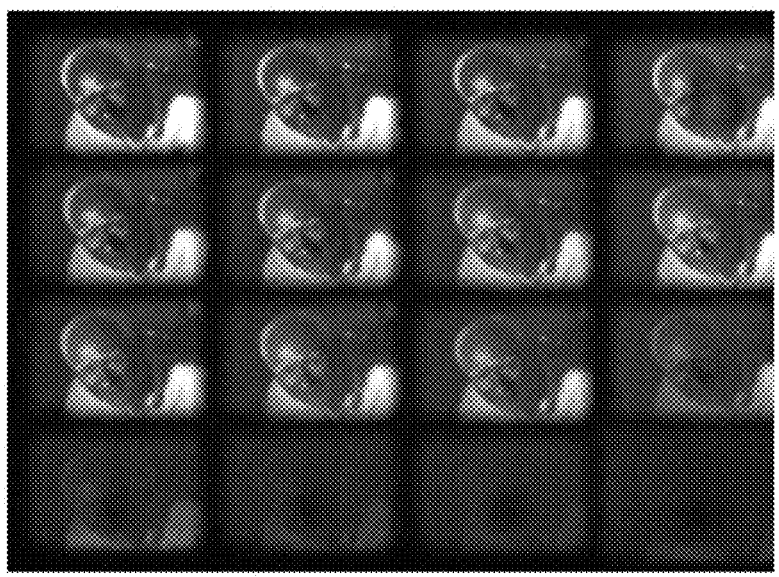
FIG. 4B shows an example image example image after removing side bands.

FIG. 4A shows an example scene captured using a 640× 512 Xenics InGaAs IR Camera with a detector bandwidth 900 nm to 1700 nm with 16 filters arrayed in a 4×4 grid with the wavelength of each filter in the grid fixed between 1400 nm to 1800 nm. It is to be noted that the Fabry-Perot filter being a resonator creates side bands and the bands in this experimental filter grid below 1400 nm was not removed. An example image after removing side bands is shown in FIG. 4B. The last four images in this figure were captured outside the detector sensitivity range (over 1700 nm). Hence their pixel intensity is too low to extract spectral information. This camera had an illumination which consisted of a heat lamp black body radiator and a xenon flash lamp with a long pass filter with a pass band threshold of 700 nm. This provided sufficient illumination over the spectral sensitivity region of interest. Using a 640×512 camera, a normal single band capture without the honeycomb lens and filter assembly results in an image comprising 640×512 pixels integrating over the whole spectral detection region of the camera. Use of a multi-filter grid for simultaneous multi-band capture reduces the spatial size of the image (depending on the number of filters) with the pixels associated with each filter being wavelength band limited to a different spectral band. In this example, each image comprises a total of 160×128 pixels because of the 4×4 grid.

Example Embodiment of Image Pre-Processing

Figure 7:
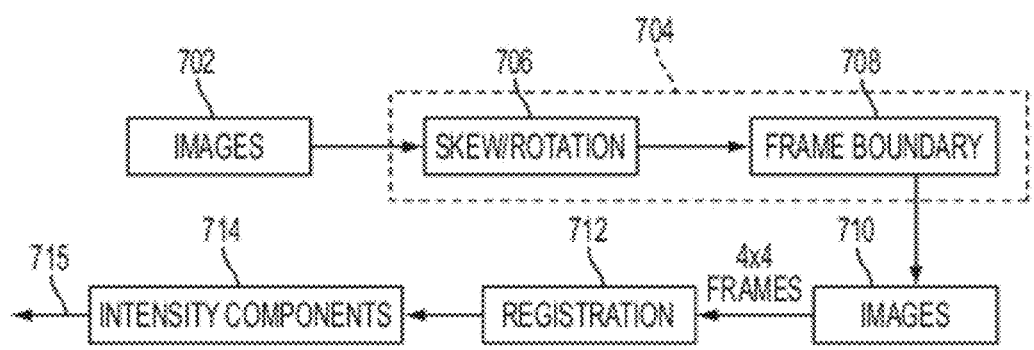
FIG. 7 illustrates one example embodiment of pre-processing a captured image in advance of further processing in accordance with the teachings hereof.

Reference is now being made to FIG. 7 which illustrates one example embodiment of pre-processing a captured image in advance of further processing in accordance with the teachings hereof.

Figure 8:
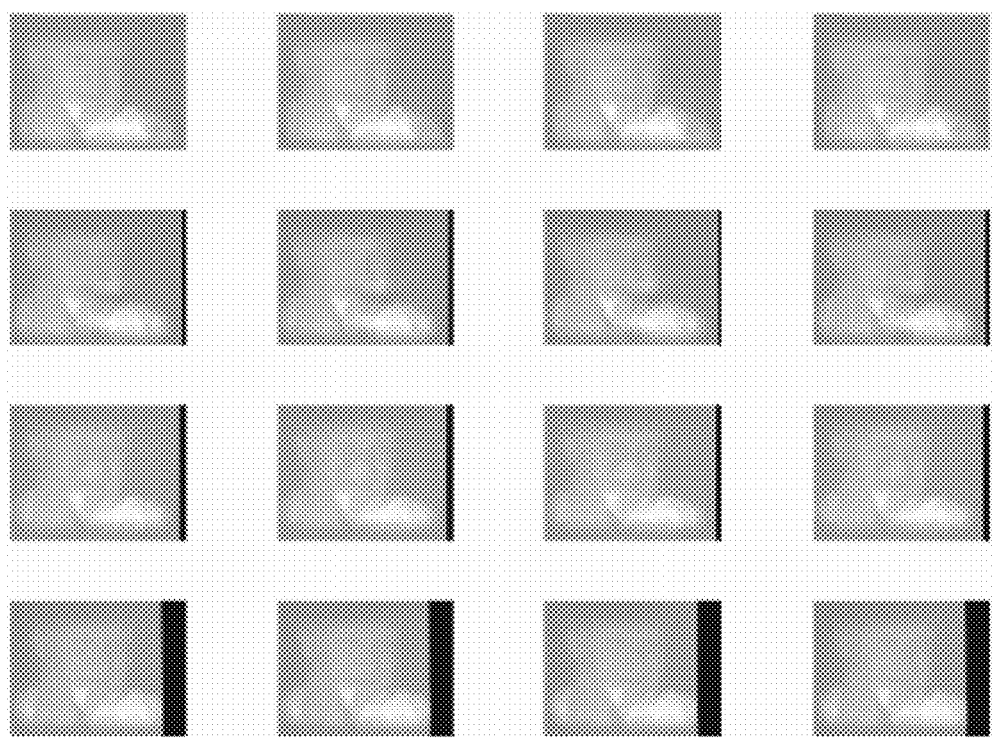
FIG. 8 shows an array of spectral images processed according to the embodiment of FIG. 7.

A single captured image 702 comprising, in this example, the 4×4 array of individual images of FIG. 4, are preferably first contrast enhanced utilizing known contrast enhancement techniques such as histogram equalization or contrast adjustment. The contrast enhanced array of images is provided to image correction algorithm 704 wherein the image array is skew and rotation corrected 706. Gaps are detected 708 between frames of the images through peak (valley) detection in each of the x and y directions. Boundary corrected original image 710 (not the contrast enhanced) is then cropped into separate images, 16 entries in this example. It should be appreciated that boundaries of each image can be uneven due to misalignment of Fabry-Perot cells, hence the need for such correction. Once cropped into individual entries, a frame registration 712 is performed. Any magnification error and relative shift due to the location of each filter band within the filter and camera-to-object distance can also be detected and corrected at this juncture. Intensity values 714 associated with each pixel in the array of 16 images is re-scaled based on the sensor response of each wavelength band. Output 715 comprises an array of corrected images as shown in FIG. 8. It should be appreciated that each of the images represents one of the spectral planes captured at a different spectral band as specified by the tunable filters of the Fabry-Perot multi-filter grid used in this experiment. The array of spectral planes comprises the hyperspectral image data cube.

Example Hyperspectral Image Data Cube

Reference is now made to FIG. 9 which illustrates a hyperspectral image data cube constructed from the array of FIG. 8.

In this example, hyperspectral image data cube 900 comprises 16 spectral planes corresponding to the processed image of FIG. 8. Each of the spectral planes comprises an array of pixel locations in each of the x and y directions. Each pixel location has a corresponding spectral component as detected by the camera's 2D sensor array. The spectral planes are aligned in the cube such that, for example, pixel location $902_1$ of the first spectral plane corresponds to a same pixel location of second spectral plane $902_2$, and to pixel location $902_{15}$ and location $902_{16}$ including all the planes therebetween. As will be discussed herein further with respect to step 1008 of the flow diagram of FIG. 10, a multi-dimensional vector is constructed for each pixel location in the 2D array of pixels. This vector is constructed using pixel locations spectral components as measured by the camera's sensors. As such, pixel location $902_1$ of the first spectral plane of image data cube 900 has an associated spectral component $S_1$. Likewise, pixel location $902_2$ has an associated spectral component $S_2$, as does pixel location $902_{15}$ ($S_{15}$) and $902_{16}$ ($S_{16}$). Likewise, each pixel at this same location in the 2D array of pixels for all the spectral planes therebetween has a respective spectral component. Each pixel location in the 2D array of pixels has an associated multi-dimensional vector V constructed using each pixel's associated spectral components: $\{S_1, S_2, \ldots S_{16}\}$. The constructed multi-dimensional vectors are used in accordance with the embodiment next discussed with respect to the flow diagrams of FIGS. 10 and 11.

Example Flow Diagram

Figure 10:
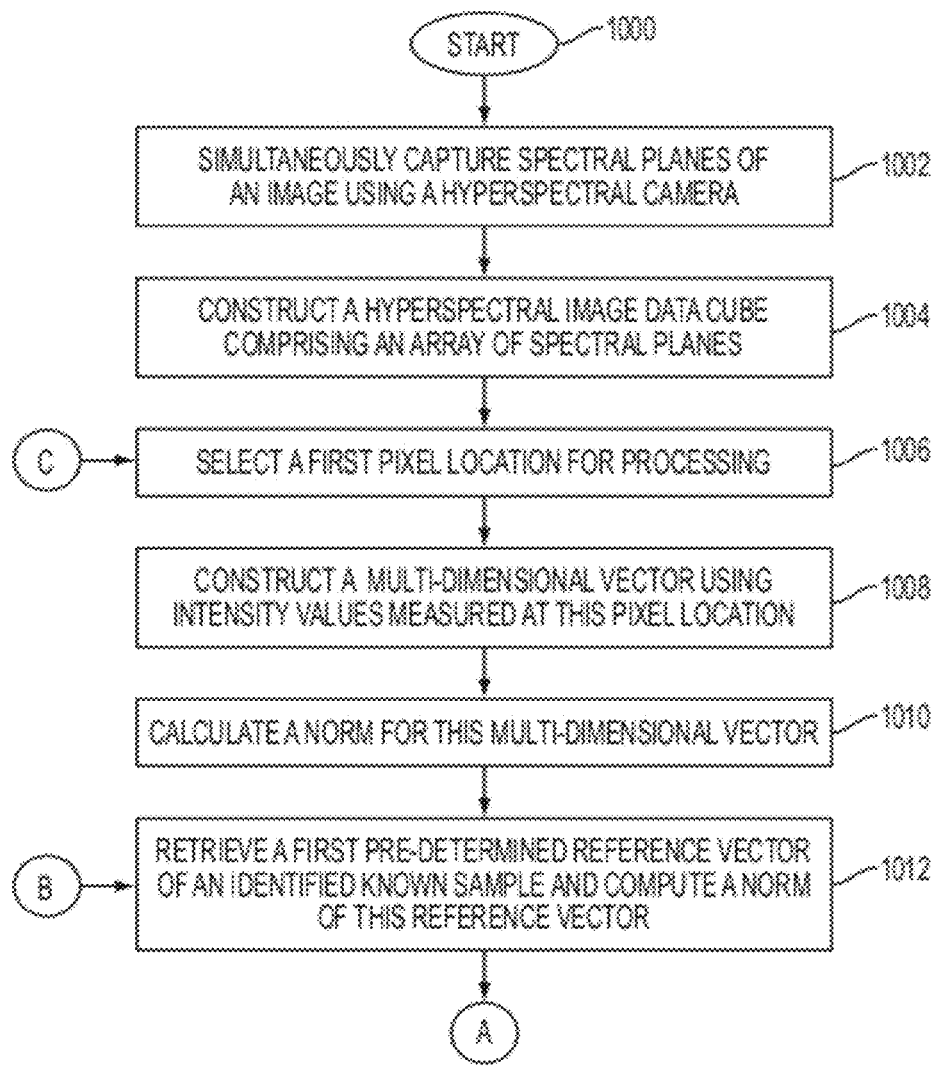
FIG. 10 is a flow chart illustrating one example embodiment of the present method for identifying a target object in a hyperspectral image data cube.

Reference is now being made to the flow diagram of FIG. 10 which illustrates one example embodiment of the present method for identifying a target object in a hyperspectral image data cube. Flow processing begins at step 1000 and immediately proceeds to step 1002.

At step 1002, different spectral planes of an image of interest are captured using a hyperspectral camera having an array of sensors and a multi-grid filter for multi-band capture of various spectral planes of a desired object or scene. Each filter is tuned to a specific wavelength of the electromagnetic (EM) spectrum. In one embodiment, a Fabry-Perot filter is used for simultaneous multi-band capture of the spectral planes. A filter wheel can be employed, in the alternative, for non-simultaneous multi-band capture of the different spectral planes. The images are pre-processed in a manner as described with respect to FIG. 7 to obtain the image array of FIG. 8.

At step 1004, a hyperspectral image data cube is constructed. The image data cube comprises an array of spectral planes of the captured image. Each of the spectral planes comprises a 2-dimensional array of pixels. Pixel locations in the array have a respective spectral intensity component measured at one of the wavelengths as defined by the filters employed. An example hyperspectral image data cube is shown in FIG. 9.

Figure 16:
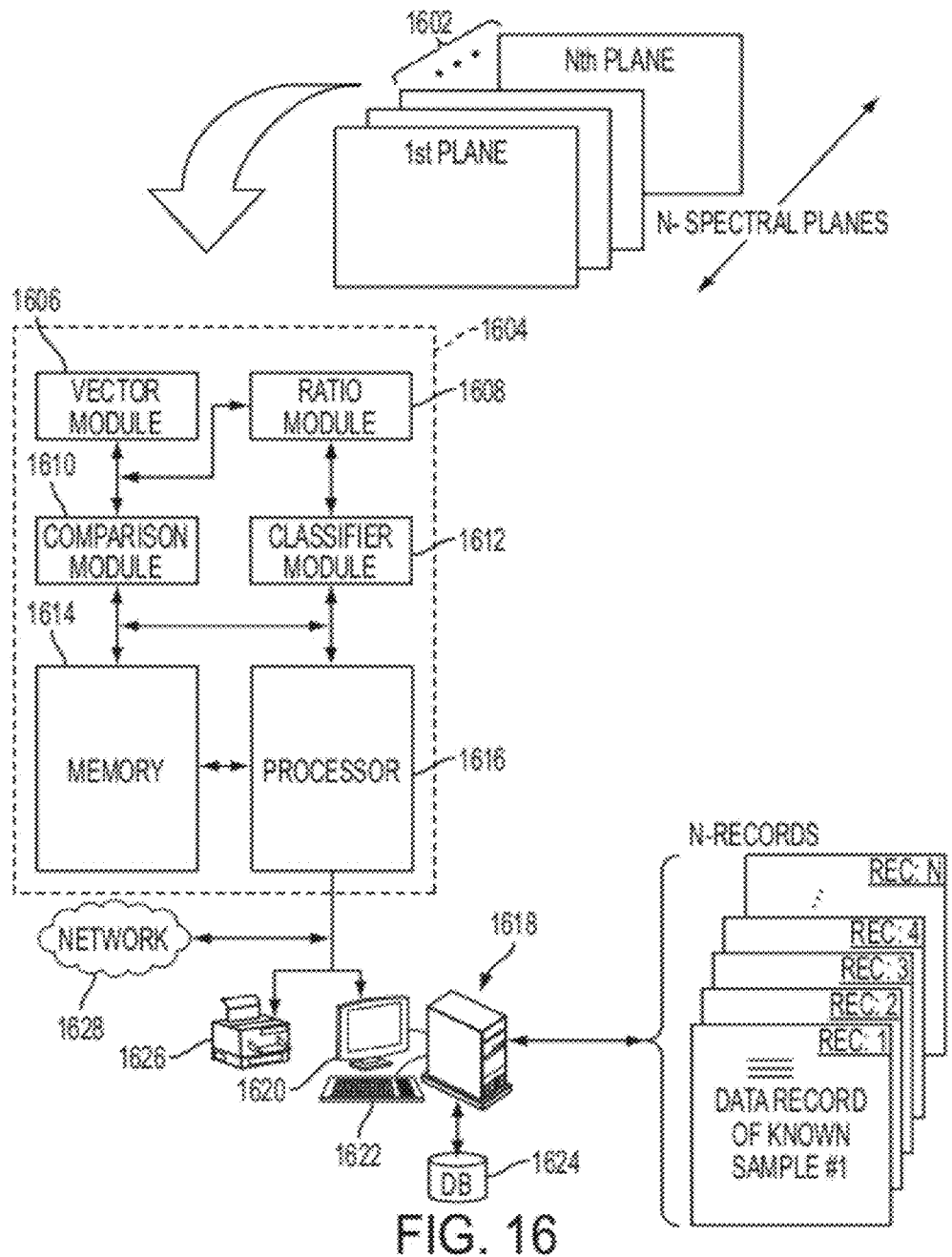
FIG. 16 illustrates one example embodiment of a function block diagram having a networked computer workstation, database, plurality of data records, and an image processing system for performing various aspects of the present method as described with respect to the flow diagrams of FIGS. 10 and 11.

At step 1006, a first pixel location is selected for processing. The first pixel location in the image can be selected for processing by a user via a graphical user interface of a computer workstation are processed automatically. One or more areas of the image being analyzed may be pre-selected for processing or processed ahead of other image areas. One example computer workstation is shown in FIG. 16. One example pixel location is shown and discussed with respect to location 902 of FIG. 9.

At step 1008, a multi-dimensional vector is constructed for this pixel location. The multi-dimensional vector is constructed using the associated spectral intensity values of the pixel locations across the array of spectral planes. Example intensity values ($S_i$) of each of the spectral planes corresponding to pixel location $902_i$ of FIG. 9 are used to construct the multi-dimensional vector for this example pixel location.

At step 1010, a norm is calculated for this pixel location's constructed multi-dimensional vector. Methods for calculating a vector norm are well established. Given an n-dimensional vector:

$$x = \begin{bmatrix} x_1 \\ x_2 \\ \vdots \\ x_n \end{bmatrix},$$

a general vector norm $|x|$, also written as $\|x\|$, is a nonnegative norm defined such that $\|x\|>0$ when $x \neq 0$ and $\|x\|=0$ if $x=0$. If the multi-dimensional vector for the $i^{th}$ pixel location is given by: $V_i$ then the norm is: $\|V_i\|$.

At step 1012, a first reference vector is retrieved from a database of vectors predetermined for a plurality of identified known samples. The reference vector may be retrieved from a storage device or from a remote device over a network. A norm is calculated for this reference vector. If the reference vector is given by: $V_{ref}$ then the norm is: $\|V_{ref}\|$. Norms of the reference vectors may be pre-computed and iteratively retrieved.

Figure 11:
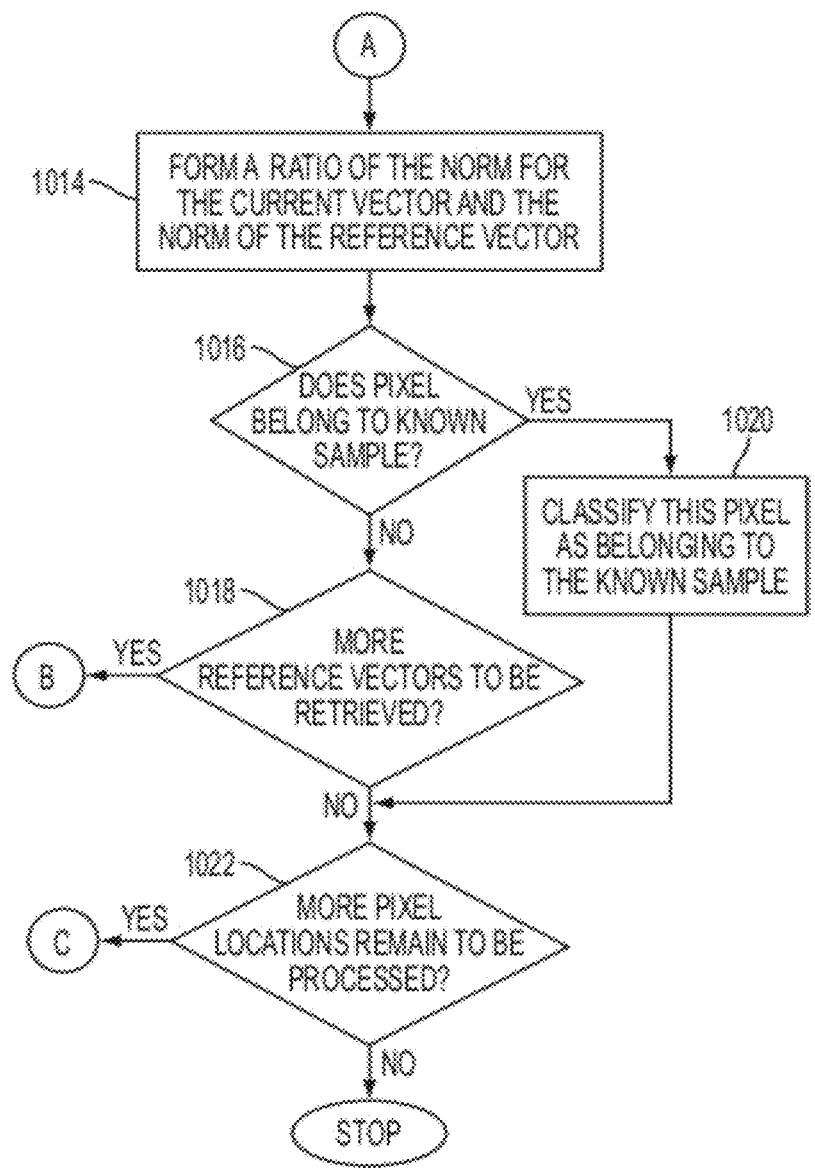
FIG. 11 is a continuation of the flow diagram of FIG. 10 with flow processing continuing with respect to node A.

Reference is now being made to the flow diagram of FIG. 11 which is a continuation of the flow diagram of FIG. 10 with flow processing continuing with respect to node A.

At step 1014, a ratio is formed from the norm of the vector constructed for the pixel location selected in step 1006, and the norm of the reference vector of step 1012. This ratio is then given by: $\|V_i\|/\|V_{ref}\|$. This ratio has a numeric value.

At step 1016, a determination is made whether this pixel belongs to the identified known sample based upon a value of the ratio of step 1014. If the value of the ratio is close to 1.0 then it can be determined that the pixel belongs to the class of materials to which the retrieved reference vector belongs. A perfect match would result in a value of 1.0 to within an acceptable number of decimal places. If it is determined that this pixel belongs to the identified known reference sample material, then processing continues with respect to step 1020 wherein the pixel is classified based upon this determination. On the other hand, if it is determined that the pixel does not belong to this identified known sample, i.e., the value of the determined ratio is not close to 1.0 then, at step 1018, a determination is made whether any more reference vectors (or reference norms) remain to be retrieved for processing. If so then the method repeats with respect to node B wherein, at step 1012, a next reference vector is retrieved corresponding to another identified known sample. A ratio is formed from this same pixel location's vector norm and the norm of this next reference vector. A determination is then made whether this pixel belongs to this next identified known sample based upon the value of the ratio. If it is determined that this pixel location does not belong to this reference sample, then another reference vector is retrieved and the process repeats until either this pixel location in the image has been identified as belonging to a known sample material or no more reference vectors remain to be retrieved.

At step 1022, a determination is made whether any more pixel locations remain to be processed. If so then processing repeats with respect to node C wherein, at step 1006, a next pixel location is selected for processing. A multi-dimensional vector is constructed for this pixel location in a manner as previously described, and a reference vector of a first identified known sample is retrieved. Processing repeats with respect to this next pixel location until either this pixel has been identified as belonging to one of the identified known samples and classified accordingly, or no more reference vectors remain. Once all the pixel locations have been processed accordingly, further processing stops. In some examples, similar vectors from a hyperspectral image data cube are first grouped together using a clustering algorithm before a reference vector is compared to the vector representing said cluster center.

After all the pixel locations have been processed accordingly and some or all of the pixel locations have been classified as belonging to an identified known sample, hueristics can be employed to count the number of living objects in the image such that, for example, the number of humans can be counted for a transportation management system or, for example, in a security system. In other applications, a captured image of a scene containing pixels which have been identified as belonging to materials known to be contraband can trigger an alert to law enforcement authorities. In an airport security scenario, spectral images can be taken of passenger baggage and authorities alerted if it is determined that one or more pixels in the captured image have been identified as belonging to explosives or substances which are known to be hazardous. The teachings hereof find their uses in a wide array of applications.

Performance Results

Figure 12:
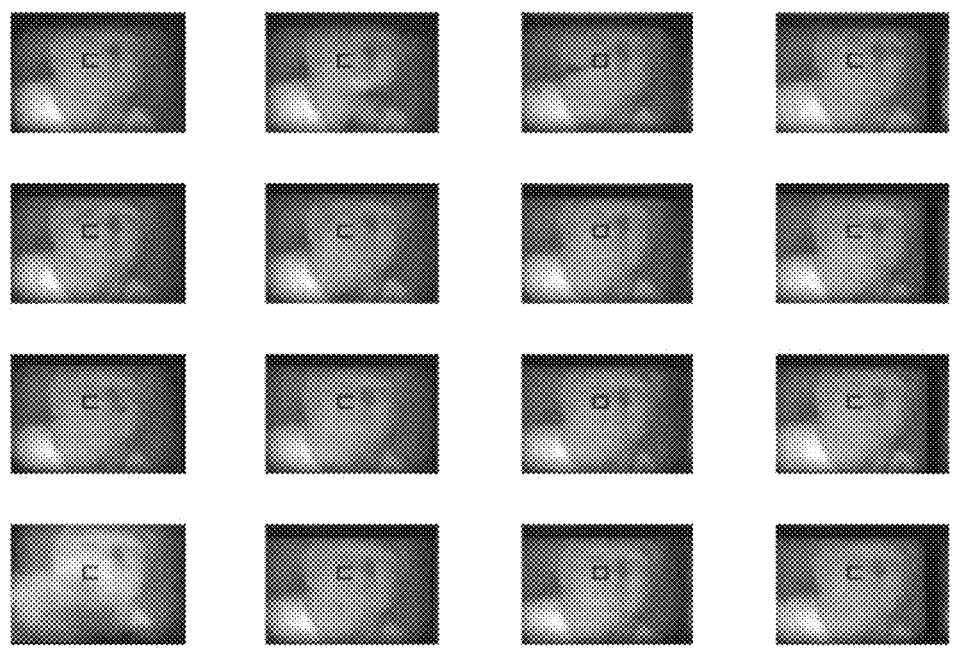
FIG. 12 shows an example hyperspectral image data cube with an area selected for detection.

FIG. 12 shows an example array of hyperspectral images (a cube) with an area having been selected for processing in accordance with the teachings hereof.

Figure 13:
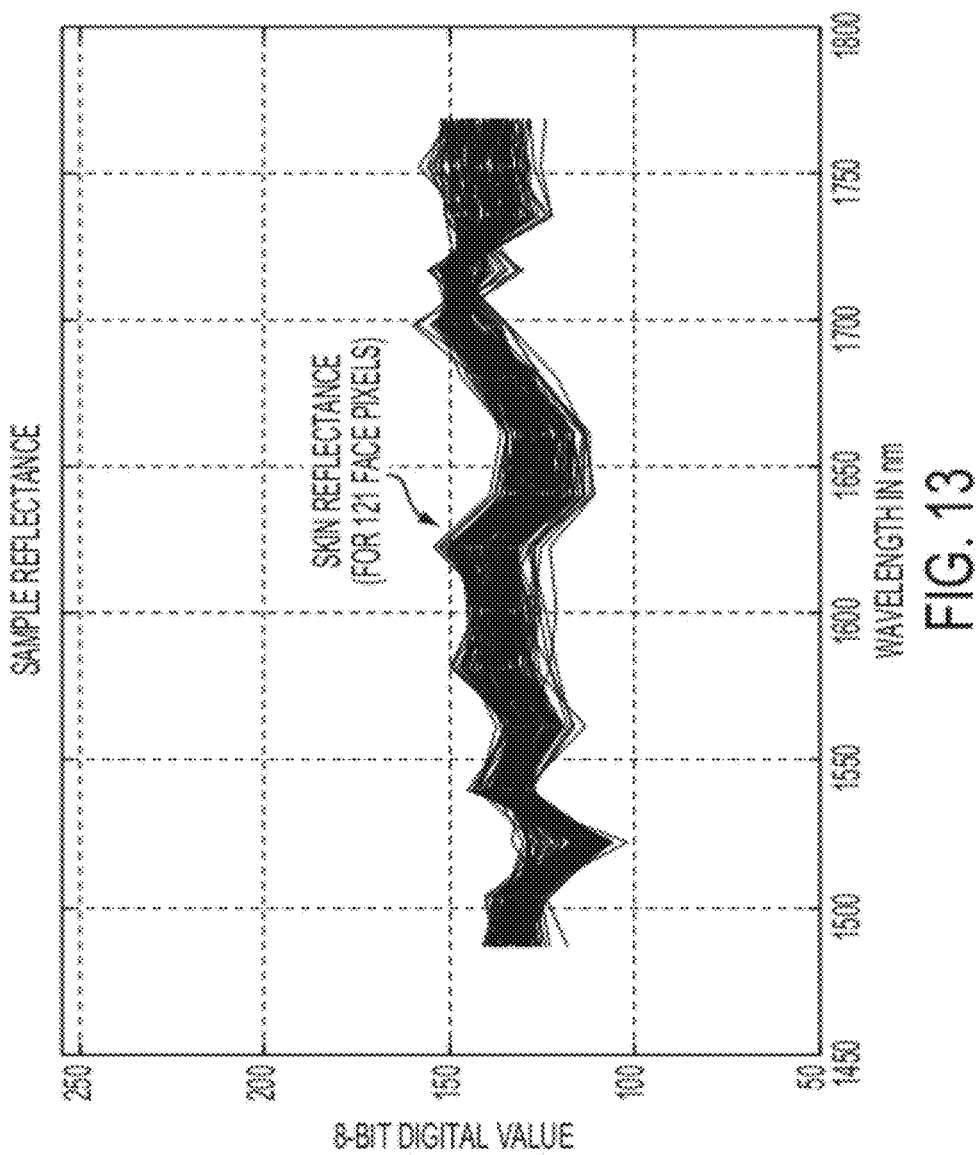
FIG. 13 graphs reflectances of skin pixels in the selected area of FIG. 12.

FIG. 13 graphs reflectances of skin pixels in the select area of FIG. 12.

Figure 14:
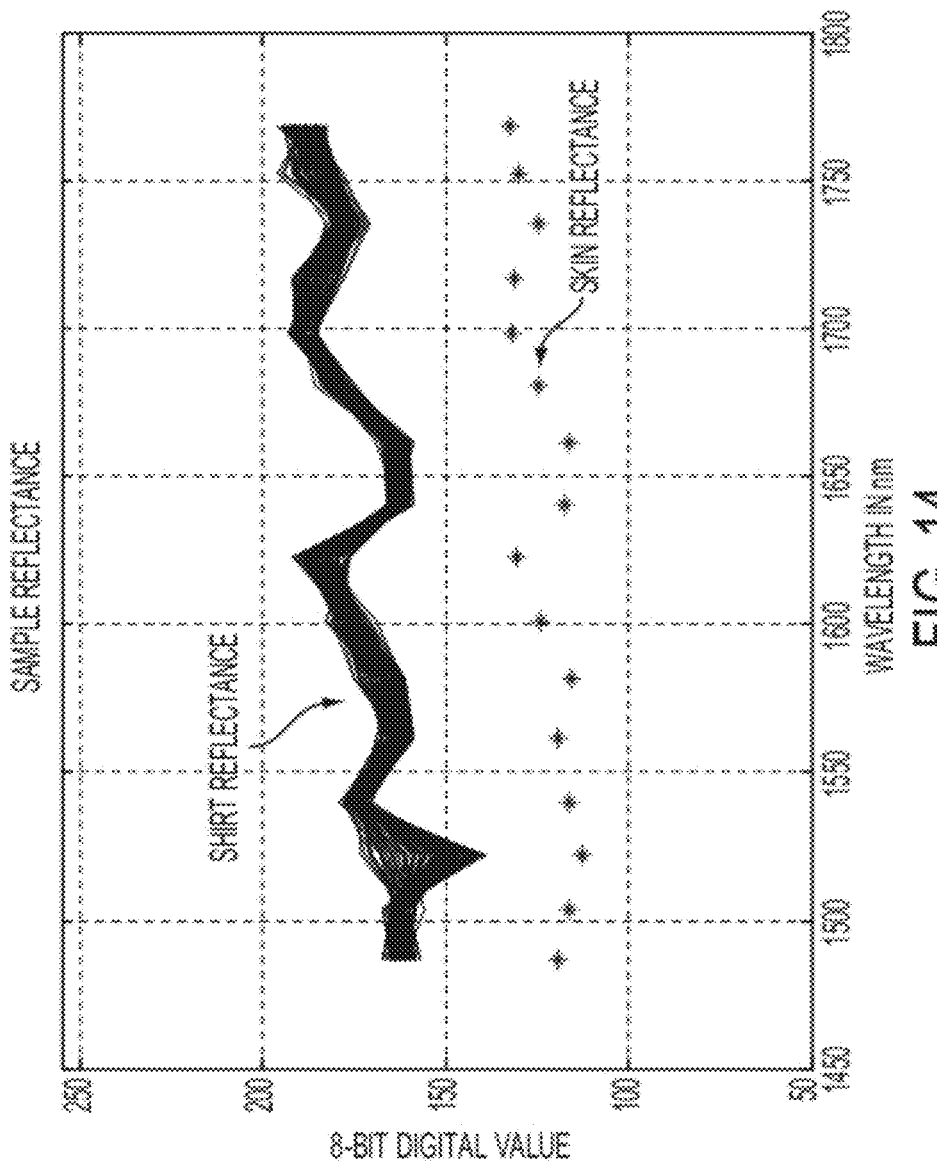
FIG. 14 overlays reflectances of skin with reflectances of a reference shirt.

FIG. 14 overlays reflectances of skin reflectance with reflectances of a reference shirt.

FIG. 15 shows results of ratios of norms calculated from multi-dimensional vectors of various materials and norms of sample reflectance vectors and a ratio of these. Note that the reference labeled "Ik04_skin" has a ratio value of 1.0011, which demonstrates that the methods hereof worked exceptionally well using reference vectors obtained from measurements taken from the actual person in the image. In this test, skin pixels of the image were able to be identified as belonging to one particular person over another.

Example Networked Computing System

Reference is now being made to FIG. 16 which illustrates one example embodiment of a function block diagram having a networked computer workstation, database, plurality of data records, and an image processing system for performing various aspects of the present method as described with respect to the flow diagrams of FIGS. 10 and 11.

In FIG. 16, an example hyperspectral image data cube 1602 constructed using N-spectral planes (such as those shown by way of example in FIG. 9) is provided to image processing system 1604 shown comprising a plurality of modules configured to perform various aspects of the steps described with respect to the embodiments hereof. In this example, vector module 1606 identifies the pixel locations of each of the corresponding spectral planes and computes a multi-dimensional vector for this location. Ratio module 1608 receives the constructed multi-dimensional vector constructed for a given pixel location and the reference vector (or norm) obtained by processor 1616 from memory 1614 having been pre-loaded from reference vectors received by workstation 1618, and computes a value for the ratio in a manner more fully described above. The value of the ratio is passed to comparison module 1610 which determines therefrom whether this pixel location belongs to the identified sample material(s) associated with this reference vector. If so, then classifier module 1612 classifies this pixel as belonging to this class of materials. This classification is passed to workstation 1618 by processor 1616 and/or stored in memory 1614. If not, then workstation 1618 is notified and processor 1616 retrieves from memory 1614 another reference vector belonging to another class of identified known samples, and passes this reference vector to ratio module 1608 wherein norm of the reference vector is computed and a ratio is formed from the norm of the vector constructed for this pixel location and the norm of the reference vector. The value of the ratio thereof is passed to comparison module 1610 which, in turn, performs another comparison of the value of the ratio to determine whether this pixel belongs to the identified known materials associated with this next reference vector. If so, then classifier module classifies this pixel location accordingly and workstation 1618 is notified. Processing repeats in such a manner until all desired pixel locations in the spectral planes of the received hyperspectral image data cube 1602 have been processed. Processor 1616 and memory 1614 collectively facilitate the functions performed by any of the modules while providing memory storage and processing throughput between the various modules and workstation 1618. Processor 1616 is capable of executing machine readable program instructions for performing various aspects of any of the functionality of any of the modules of system 1604. Processor 1616 is in communication with computer workstation 1618. Workstation 1618 facilitates a user interaction with system 1604 via monitor 1620 and keyboard 1622 (mouse not shown). The plurality of N-records is illustrative. These data records contain information about identified sample materials. Such information includes associated reference vectors and/or pre-computed vector norms. In one embodiment, the received hyperspectral image data cube is provided, in whole or in part, by processor 1616 to workstation 1618 for processing and storage. Some or all of the information received by the workstation may be stored in database 1624. In various embodiments, the user selects, via keyboard 1622, areas of the image displayed on monitor 1620 for processing in accordance herewith. Pixel locations or other image information required for processing the image may be generated without a user input. Printer 1626 enables the user to obtain a hardcopy of information regarding the processed image. Printed information may take the form of, for example, various classifications which have been identified for various pixel locations within the image or within areas of the image. Information may be communicated to the workstation by any of the modules of system 1604 via processor 1616 or via communications pathways not shown. Workstation 1618 and any of the modules of system 1604 may communicate with one or more remote devices over network 1628. Results of any of the pixel classifications performed in accordance with the teachings hereof can be communicated to one or more systems over network 1628 for processing. Example information may take the form of notifying a transportation management system or a law enforcement authority about the objects identified in the captured image.

Features or functionality of any of the above-described modules may comprise, in whole or in part, a special purpose computer which includes a special purpose processor capable of executing machine readable program instructions for carrying out one or more aspects of the present method. Such a special purpose computer may comprise, for example, a micro-processor, micro-controller, device driver, an electronic circuit, or an ASIC designed to perform some or all of the methods hereof. Such a special purpose computer can be integrated, in whole or in part, with for example, a xerographic system, a color management system, an image processing system, a digital front end (DFE), and the like. All or portions of the diagrams of the present system and method, as illustrated herein, may be implemented partially or fully in hardware in conjunction with machine executable instructions in communication with various components of such a system. The exact nature of the implementation will depend on the document processing environment wherein the present method finds its intended uses. One embodiment special purpose computer is shown and discussed with respect to FIG. 17.

It should be appreciated that the functional block diagram of FIG. 16 is illustrative and that some or all of the functionality performed by any of the modules of system 1604 may be performed, in whole or in part, by workstation 1618 or by a special purpose computer system. It should be appreciated that various modules may designate one or more components which may, in turn, comprise software and/or hardware designed to perform the intended function. A plurality of modules may collectively perform a single function. Each module may comprise a single piece of hardware such as an ASIC. A plurality of modules may be executed by either a single system or a plurality of systems functioning in parallel.

Connections between modules include both physical and logical connections. Modules may further include one or more software modules which may further comprise an operating system, drivers, device controllers, and other apparatuses some or all of which may be connected via a network. It is also contemplated that one or more aspects of the present method may be implemented in distributed computing environments where tasks are performed by remote devices that are linked through a network.

Example Special Purpose Computer

Figure 17:
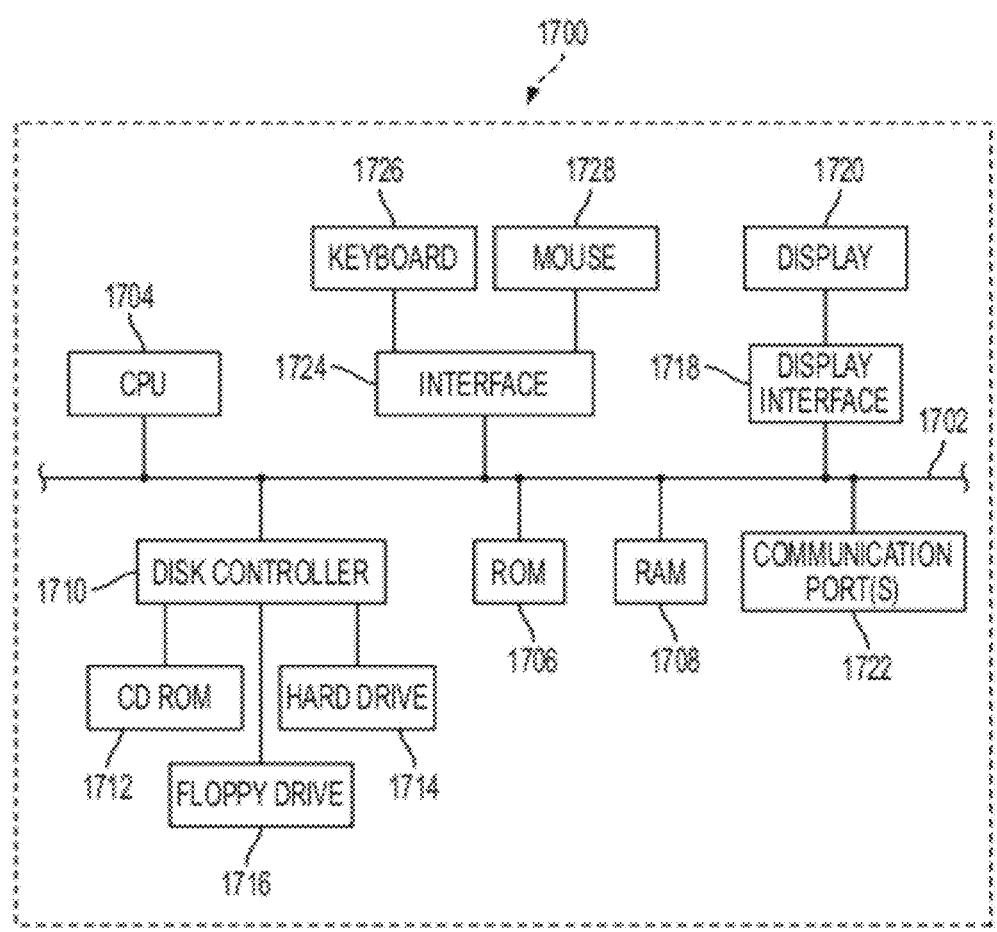
FIG. 17 illustrates a block diagram of one example embodiment of a special purpose computer system for implementing one or more aspects of the methods hereof as described with respect to the flow diagrams of FIGS. 10 and 11, and the functional block diagram of FIG. 16.

Reference is now being made to FIG. 17 which illustrates a block diagram of one example embodiment of a special purpose computer system for implementing one or more aspects of the methods hereof as described with respect to the flow diagrams hereof and the functional block diagram of FIG. 16.

Special purpose processor 1700 is capable of executing machine executable program instructions. Communications bus 1702 serves as an information highway interconnecting the other illustrated components of special purpose computer system 1700. The special purpose computer incorporates a central processing unit (CPU) 1704 capable of executing machine readable program instructions for performing any of the calculations, comparisons, logical operations, and other program instructions for performing the methods described above with respect to the flow diagrams hereof. The CPU is in communication with Read Only Memory (ROM) 1706 and Random Access Memory (RAM) 1708 which, collectively, constitute example memory storage devices. Such memory may be used to store machine readable program instructions and other program data and results to sufficient to carry out any of the functionality described herein. Disk controller 1710 interfaces with one or more storage devices 1714. These storage devices may comprise external memory, zip drives, flash memory, USB drives, memory sticks, or other storage devices with removable media such as CD-ROM drive 1712 and floppy drive 1716. Such storage devices may be used to implement a database wherein various records of objects are stored for retrieval. Example computer readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs may be stored in a main memory and/or a secondary memory. Computer programs may also be received via the communications interface. The computer readable medium is further capable of storing data, machine instructions, message packets, or other machine readable information, and may include non-volatile memory. Such computer programs, when executed, enable the computer system to perform one or more aspects of the methods provided herein.

Display interface 1718 effectuates the display of information on display device 1720 in various formats such as, for instance, audio, graphic, text, and the like. Interface 1724 effectuates a communication via keyboard 1726 and mouse 1728. Such a graphical user interface is useful for a user to review displayed information in accordance with various embodiments hereof. Communication with external devices may occur using example communication port(s) 1722. Such ports may be placed in communication with the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via any of the communication ports 1722 are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

VARIOUS EMBODIMENTS

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture may be included as part of a system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims.

Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for identifying a target object in a hyperspectral image, the method comprising:
   capturing different spectral planes of an image using a hyperspectral camera having a multi-filter grid, the multi-filter grid comprising a plurality of filters, each filter being tuned to a respective band comprising a respective specified wavelength of the electromagnetic spectrum, each respective band corresponding to a respective spectral plane;
   constructing a hyperspectral image data cube comprising a plurality of 2-dimensional arrays of pixels, each 2-dimensional array comprising respective intensity values for each pixel of a respective band corresponding to a respective spectral plane; and
   for each pixel location in said hyperspectral image data cube:
      constructing at least one multi-dimensional vector comprising intensity values of at least one pixel from across at least a portion of said spectral planes, each dimension of said vectors corresponding to a respective intensity of a respective spectral plane;
      calculating a magnitude of said pixel's multi-dimensional vector;
      comparing said magnitude to a corresponding magnitude calculated for a reference vector predetermined for an identified known sample;
      determining whether said pixel belongs to said known sample based upon a determination by said comparing that said magnitude is within a threshold value of said corresponding magnitude calculated for said reference vector; and
      classifying said pixel based upon said determination.

2. The method of claim 1, wherein said comparing said magnitude comprises:
   forming a ratio of said magnitude of said pixel's multi-dimensional vector and said corresponding magnitude calculated for said reference vector; and
   obtaining a numeric value result from said ratio,
   wherein said determination by said comparing that said magnitude is within a threshold value of said corresponding magnitude calculated for said reference vector is based upon said numeric value.

3. The method of claim 1, further comprising pre-processing said images in advance of constructing said hyperspectral image data cube, said pre-processing comprising any of:
   improving a contrast of said image;
   correcting said image for skew;
   magnifying any of said image;
   performing a frame boundary detection on said image;
   stitching images together;
   cropping said image into frames;
   performing a frame-to-frame registration on said image;
   re-scaling any intensity values associated with said image based on the sensor response and an illumination at each wavelength; and
   selecting an area of interest in any of said images.

4. The method of claim 1, wherein said known sample comprises human skin.

5. The method of claim 1, further comprising using said classified pixels to determine a number of live objects in any of said captured hyperspectral images.

6. The method of claim 1, wherein said multi-filter grid comprises any of: a Fabry-Perot filter for simultaneous multi-band capture of said different planes, and a filter wheel for non-simultaneous multi-band capture of said different planes.

7. The method of claim 1, further comprising:
   grouping, prior to processing said vectors, similar vectors from said hyperspectral image data cube using a clustering algorithm; and
   determining a representative vector representing a cluster center of said similar vectors,
   wherein the processing said vectors comprises comparing said representative vector to said reference vector, and
   wherein the classifying comprises determining whether all of said similar vectors belongs to said known sample based upon the comparing said representative vector to said reference vector.

8. A hyperspectral imaging system for identifying a target object, the system comprising:
   a hyperspectral camera that captures images simultaneously, said camera having an array of sensors and a multi-filter grid for multi-band capture, the multi-filter grid comprising a plurality of filters, each filter being tuned to a respective band comprising a respective specified wavelength of the electromagnetic spectrum, each respective band corresponding to a respective spectral plane;
   a memory and a storage medium; and
   a processor in communication with and said storage medium, said memory, and said camera, said processor executing machine readable instructions for performing the method of:
      capturing different spectral planes of an image using said hyperspectral camera;
      constructing a hyperspectral image data cube comprising a plurality of 2-dimensional arrays of pixels, each 2-dimensional array comprising respective intensity values for each pixel of a respective band corresponding to a respective spectral plane; and
      for each pixel location in said hyperspectral image data cube:
         constructing at least one multi-dimensional vector comprising intensity values of at least one pixel from across at least a portion of said spectral planes, each dimension of said vectors corresponding to a respective intensity of a respective spectral plane;
         calculating a magnitude of said pixel's multi-dimensional vector;
         comparing said magnitude to a corresponding magnitude calculated for a reference vector predetermined for an identified known sample;
         determining whether said pixel belongs to said known sample based upon a determination by said comparing that said magnitude is within a threshold value of said corresponding magnitude calculated for said reference vector; and
         classifying said pixel based upon said determination.

9. The system of claim 8, wherein said comparing said magnitude comprises:
   forming a ratio of said magnitude of said pixel's multi-dimensional vector and said corresponding magnitude calculated for said reference vector; and
   obtaining a numeric value result from said ratio, wherein said determination by said comparing that said magnitude is within a threshold value of said corresponding magnitude calculated for said reference vector is based upon said numeric value.

10. The system of claim 8, further comprising pre-processing said images in advance of constructing said hyperspectral image data cube, said pre-processing comprising any of:
improving a contrast of said image;
correcting said image for skew;
magnifying any of said image;
performing a frame boundary detection on said image;
stitching images together;
cropping said image into frames;
performing a frame-to-frame registration on said image;
re-scaling any intensity values associated with said image based on the sensor response and illumination at each wavelength; and
selecting an area of interest in any of said images.

11. The system of claim 8, wherein said known sample comprises human skin.

12. The system of claim 8, further comprising using said classified pixels to determine a number of live objects in any of said captured hyperspectral images.

13. The system of claim 8, wherein said multi-filter grid comprises any of: a Fabry-Perot filter for simultaneous multi-band capture of said different planes, and a filter wheel for non-simultaneous multi-band capture of said different planes.

14. The system of claim 8, further comprising:
grouping, prior to processing said vectors, similar vectors from said hyperspectral image data cube using a clustering algorithm; and
determining a representative vector representing a cluster center of said similar vectors,
wherein the processing said vectors comprises comparing said representative vector to said reference vector, and
wherein the classifying comprises determining whether all of said similar vectors belongs to said known sample based upon the comparing said representative vector to said reference vector.

15. A computer implemented method for identifying a target object in a hyperspectral image, the method comprising:
capturing different spectral planes of an image using a hyperspectral camera having a multi-filter grid, the multi-filter grid comprising a plurality of filters, each filter being tuned to a respective band comprising a respective specified wavelength of the electromagnetic spectrum, each respective band corresponding to a respective spectral plane;
pre-processing said images;
constructing a hyperspectral image data cube comprising a plurality of 2-dimensional arrays of pixels, each 2-dimensional array comprising respective intensity values for each pixel of a respective band corresponding to a respective spectral plane; and
for each pixel location in said hyperspectral image data cube:
constructing at least one multi-dimensional vector comprising intensity values of at least one pixel from across at least a portion of said spectral planes, each dimension of said vectors corresponding to a respective intensity of a respective spectral plane;
calculating a magnitude of said pixel's multi-dimensional vector;
comparing said magnitude to a corresponding magnitude calculated for a reference vector predetermined for an identified known sample;
determining whether said pixel belongs to said known sample based upon a determination by said comparing that said magnitude is within a threshold value of said corresponding magnitude calculated for said reference vector; and
classifying said pixel based upon said determination.

16. The computer implemented method of claim 15, wherein said comparing said magnitude comprises:
forming a ratio of said magnitude of said pixel's multi-dimensional vector and said corresponding magnitude calculated for said reference vector; and
obtaining a numeric value result from said ratio,
wherein said determination by said comparing that said magnitude is within a threshold value of said corresponding magnitude calculated for said reference vector is based upon said numeric value.

17. The computer implemented method of claim 15, wherein pre-processing said images comprises any of:
improving a contrast of said image;
correcting said image for skew;
magnifying any of said image;
performing a frame boundary detection on said image;
stitching images together;
cropping said image into frames;
performing a frame-to-frame registration on said image;
re-scaling any intensity values associated with said image based on the sensor response and illumination at each wavelength;
shifting any of said image; and
selecting an area of interest in any of said images.

18. The computer implemented method of claim 15, wherein said known sample comprises human skin.

19. The computer implemented method of claim 15, further comprising using said classified pixels to determine a number of live objects in any of said captured hyperspectral images.

20. The computer implemented method of claim 15, wherein said multi-filter grid comprises any of: a Fabry-Perot filter for simultaneous multi-band capture of said different planes, and a filter wheel for non-simultaneous multi-band capture of said different planes.

21. The computer implemented method of claim 15, further comprising:
grouping, prior to processing said vectors, similar vectors from said hyperspectral image data cube using a clustering algorithm; and
determining a representative vector representing a cluster center of said similar vectors,
wherein the processing said vectors comprises comparing said representative vector to said reference vector, and
wherein the classifying comprises determining whether all of said similar vectors belongs to said known sample based upon the comparing said representative vector to said reference vector.

22. The method of claim 1, wherein the plurality of filters comprises filters with respective wavelengths between 1400 nm and 1800 nm.

23. The method of claim 22, wherein the plurality of filters comprises filters with respective wavelengths covering an optical spectrum between at least 1500 nm and 1750 nm.

* * * * *